United States Patent
Nakayama et al.

(10) Patent No.: US 10,533,100 B2
(45) Date of Patent: *Jan. 14, 2020

(54) NEAR-INFRARED SHIELDING MATERIAL FINE PARTICLES AND METHOD FOR PRODUCING THE SAME, AND NEAR-INFRARED SHIELDING MATERIAL FINE PARTICLE DISPERSION LIQUID

(71) Applicant: SUMITOMO METAL MINING CO., LTD., Tokyo (JP)

(72) Inventors: Hiroki Nakayama, Isa (JP); Hirofumi Tsunematsu, Isa (JP); Takeshi Chonan, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/084,937

(22) PCT Filed: Mar. 16, 2017

(86) PCT No.: PCT/JP2017/010686
§ 371 (c)(1),
(2) Date: Sep. 13, 2018

(87) PCT Pub. No.: WO2017/159790
PCT Pub. Date: Sep. 21, 2017

(65) Prior Publication Data
US 2019/0085181 A1    Mar. 21, 2019

(30) Foreign Application Priority Data

Mar. 16, 2016 (JP) .................................. 2016-052558
Mar. 16, 2016 (JP) .................................. 2016-052559

(51) Int. Cl.
| | | |
|---|---|---|
| *G02B 5/20* | (2006.01) | |
| *C03C 17/34* | (2006.01) | |
| *C09D 5/32* | (2006.01) | |
| *C01G 41/00* | (2006.01) | |
| *C09K 3/00* | (2006.01) | |
| *C01G 41/02* | (2006.01) | |
| *C09C 1/00* | (2006.01) | |

(52) U.S. Cl.
CPC ............ *C09D 5/32* (2013.01); *C01G 41/00* (2013.01); *C01G 41/02* (2013.01); *C03C 17/3417* (2013.01); *C03C 17/3435* (2013.01); *C03C 17/3441* (2013.01); *C09C 1/00* (2013.01); *C09K 3/00* (2013.01)

(58) Field of Classification Search
CPC .... C01G 41/02; G02B 5/208; C03C 17/3417; C03C 17/3435; C03C 17/3441; C09D 5/32; C09C 1/00
See application file for complete search history.

(56) References Cited

U.S. PATENT DOCUMENTS

| 6,416,890 B1 | 7/2002 | Terneu et al. |
| 2006/0178254 A1 | 8/2006 | Takeda et al. |

FOREIGN PATENT DOCUMENTS

| JP | H08-012378 A | | 1/1996 | |
| JP | H08-59300 A | | 3/1996 | |
| JP | H08-073223 A | | 3/1996 | |
| JP | H08-283044 A | | 10/1996 | |
| JP | H09-107815 A | | 4/1997 | |
| JP | H09-127559 A | | 5/1997 | |
| JP | 2000-119045 A | | 4/2000 | |
| JP | 2003-029314 A | | 1/2003 | |
| JP | 2003-121884 A | | 4/2003 | |
| JP | 2011-063484 A | | 3/2011 | |
| JP | 2011-063739 A | | 3/2011 | |
| JP | 2011-063740 A | | 3/2011 | |
| JP | 2011-063741 A | | 3/2011 | |
| JP | 2011063740 | * | 3/2011 | ............ C08L 101/00 |
| JP | 2013-173642 A | | 9/2013 | |
| JP | 2013173642 | * | 9/2013 | ............ C01G 41/00 |
| WO | 2005/037932 A1 | | 4/2005 | |

OTHER PUBLICATIONS

Apr. 11, 2017 International Search Report issued in International Patent Application No. PCT/JP2017/010686.
Jul. 5, 2019 European Search Report issued in European Patent Application No. 17766786.2.

* cited by examiner

*Primary Examiner* — Bijan Ahvazi
(74) *Attorney, Agent, or Firm* — Oliff PLC

(57) ABSTRACT

Near-infrared shielding material fine particles that exhibit an effect of maintaining a high transmittance in a visible light region while shielding a light in a near-infrared region more efficiently than tungsten oxide and composite tungsten oxide of a conventional technique, and the method for producing the same, and a dispersion liquid containing the near-infrared shielding material fine particles. The near-infrared shielding material fine particles are composite tungsten oxide containing a hexagonal crystal structure, and a lattice constant of the composite tungsten oxide fine particles is 7.3850 Å or more and 7.4186 Å or less on the a-axis, and 7.5600 Å or more and 7.6240 Å or less on the c-axis, and a particle size of the near-infrared shielding material fine particles is 100 nm or less.

8 Claims, No Drawings

NEAR-INFRARED SHIELDING MATERIAL FINE PARTICLES AND METHOD FOR PRODUCING THE SAME, AND NEAR-INFRARED SHIELDING MATERIAL FINE PARTICLE DISPERSION LIQUID

TECHNICAL FIELD

The present invention relates to near-infrared shielding material fine particles which are transparent in a visible light region and have absorption in a near-infrared region, and a method for producing the same, and a near-infrared shielding material fine particle dispersion liquid.

DESCRIPTION OF RELATED ART

As a light shielding member used for a window material or the like, patent document 1 proposes a light shielding film containing a black pigment containing inorganic pigments such as carbon black and titanium black having absorption in a visible light region to a near-infrared light region, and organic pigments such as aniline black having strong absorption only in the visible light region, and patent document 2 proposes a half mirror type light shielding member having metal such as aluminum vapor-deposited thereon.

Patent document 3 proposes a heat ray shielding glass which can be suitably used in a site requiring high visible light transmittance and good heat ray shielding performance, in which a composite tungsten oxide film is provided on a transparent glass substrate as a first layer from a substrate side, the composite tungsten oxide film containing at least one metal ion selected from the group consisting of IIIa group, IVa group, Vb group, VIb group and VIIb group of a periodic table, and a transparent dielectric film is provided on the first layer as a second layer, and a composite tungsten oxide film is provided on the second layer as a third layer, the composite tungsten oxide film containing at least one metal ion selected from the group consisting of IIIa group, IVa group, Vb group, VIb group and VIIb group of the periodic table, and a refractive index of the transparent dielectric film of the second layer is made lower than the refractive index of the composite tungsten oxide film of the first layer and the third layer.

Patent document 4 proposes a heat ray shielding glass in which a first dielectric film is provided on a transparent glass substrate as a first layer from a substrate side, and a tungsten oxide film is provided on the first layer as a second layer, and a second dielectric film is provided on the second layer as a third layer, in the same manner as in patent document 3.

Patent document 5 proposes a heat ray shielding glass in which a composite tungsten oxide film containing the same metal element is provided on a transparent substrate from a substrate side as a first layer, and a transparent dielectric film is provided on the first layer as a second layer, in the same manner as in patent document 3.

Patent document 6 proposes a sunlight shielding glass sheet having a sunlight shielding property, which is formed by coating thereon a metal oxide film selected from one or more kinds of tungsten trioxide ($WO_3$), molybdenum trioxide ($MoO_3$), niobium pentoxide ($Nb_2O_5$), tantalum pentoxide ($Ta_2O_5$), vanadium pentoxide ($V_2O_5$) and vanadium dioxide ($VO_2$) containing additives such as hydrogen, lithium, sodium or potassium, by a CVD method or a spraying method, and thermally decomposing at about 250° C.

Patent document 7 proposes to obtain a sunlight modulating light insulating material whose coloring and decoloring reaction to sunlight is fast, having an absorption peak at a wavelength of 1250 nm in the near-infrared region at the time of coloring, and capable of blocking near-infrared rays of sunlight, by using tungsten oxide obtained by hydrolyzing tungsten acid, and using the following properties: when an organic polymer having a specific structure called polyvinyl pyrrolidone is added to the tungsten oxide and when irradiated with sunlight, ultraviolet rays in the sunlight are absorbed by the tungsten oxide, and excited electrons and holes are generated, thereby causing remarkable increase in an amount of pentavalent tungsten due to a small amount of ultraviolet ray, and as the coloring reaction becomes faster, coloring density becomes higher, and pentavalent tungsten is extremely promptly oxidized to hexavalent by blocking light, resulting in faster decoloring reaction.

The present inventors propose in patent document 8 the following points: powder composed of tungsten trioxide or a hydrate thereof or a mixture of both is obtained by dissolving tungsten hexachloride in alcohol and evaporating the solvent as it is, or by evaporating the solvent after heating under reflux and then applying heating at 100° C. to 500° C.; an electrochromic device is obtained using the tungsten oxide fine particles; and the optical properties of the film can be changed when a multilayer laminate is formed and protons are introduced into the film.

Patent document 9 proposes a method for making various tungsten bronzes expressed by $M_xWO_3$ (M element is a metal element such as alkali, alkaline earth, rare earth, and satisfying $0<x<1$), by using meta-type ammonium tungstate and various water-soluble metal salts as raw materials, and by supplying a hydrogen gas added with an inert gas (addition amount: about 50 vol % or more) or steam (added amount: about 15 vol % or less) to a dry matter of the above mixed aqueous solution, while heating to about 300 to 700° C.

The present inventors disclose an infrared shielding material fine particle dispersion body in which infrared material fine particles are dispersed in a medium, wherein the infrared material fine particles contain tungsten oxide fine particles or/and composite tungsten oxide fine particles, and a dispersed particle size of the infrared material fine particle is 1 nm or more and 800 nm or less.

PRIOR ART DOCUMENT

Patent Document

[Patent Document 1] Japanese Patent Application Laid-Open No. 2003-029314
[Patent Document 2] Japanese Patent Application Laid-Open No. 1997-107815
[Patent Document 3] Japanese Patent Application Laid-open No. 1996-59300
[Patent Document 4] Japanese Patent Application Laid-Open No. 1996-12378
[Patent Document 5] Japanese Patent Application Laid-Open No. 1996-283044
[Patent Document 6] Japanese Patent Application Laid-Open No. 2000-119045
[Patent Document 7] Japanese Patent Application Laid-Open No. 1997-127559
[Patent Document 8] Japanese Patent Application Laid-Open No. 2003-121884
[Patent Document 9] Japanese Patent Application Laid-Open No. 1996-73223

[Patent Document 10] International Publication WO 2005/037932

SUMMARY OF THE INVENTION

Problem to be Solved by the Invention

However, according to the study of the inventors of the present invention, it is found that proposals and disclosures described in patent documents 1 to 10 have the following problems.

The black pigment described in patent document 1 has large absorption in the visible light region. Accordingly, a color tone of a window material etc. to which the black pigment is applied becomes darker, and therefore it is considered that a use method is limited.

A window material or the like to which a metal vapor deposition film described in patent document 2 is applied, has a half-mirror appearance. Therefore, when the window material or the like to which the metal vapor deposition film is applied, is used outdoors, it is considered that reflection is dazzling and there is a problem in terms of a landscape.

Heat ray shielding materials described in patent documents 3 to 5 are mainly produced by a method using a dry method by a vacuum film forming method such as a sputtering method, a vapor deposition method, an ion plating method and a chemical vapor deposition method (CVD method). Therefore, there is a problem that a large-sized production device is required and a production cost is increased.

Further, a base material of the heat ray shielding material is exposed to high temperature plasma or heating after film formation is necessary. For this reason, when using a resin such as a film as a substrate, it is necessary to additionally investigate the film formation conditions on the equipment.

In addition, the tungsten oxide film and the composite tungsten oxide film described in these patent documents 3 to 5, are the films that exhibit a predetermined function when a multilayer film with another transparent dielectric film is formed, and therefore it is considered to be different from the present invention.

A sunlight-controlled coated glass sheet described in patent document 6 is formed as a film on a glass by a CVD method, or a combination of a spray method and a thermal decomposition method. However, there are limitations such as expensive raw materials to be a precursor and thermal decomposition at high temperature, and therefore in the case of using the resin such as a film as a base material, it is necessary to separately investigate the film formation conditions. Further, this film is a film that exhibits a predetermined function when forming a multilayer film of two or more layers and it is considered that this is a different proposal from the present invention.

The sunlight modulatable light heat insulating material and an electrochromic device described in patent documents 7 to 8, are materials that change the color tone of the film due to ultraviolet rays or a potential difference, and therefore it is considered that they are hardly applied to a field of application where a film structure is complicated and change in color tone is not desired.

Patent document 9 describes a method for producing tungsten bronze. However, this document does not describe a particle size and optical properties of the obtained powder. This is because in this document, it is considered that the tungsten bronze is used as an electrode material of an electrolytic device, a fuel cell, or a catalytic material of organic synthesis. Namely, it is considered that this is a different proposal from the present invention.

Patent Document 10 is made to solve the above-described problem, and provides the near-infrared shielding material fine particles, a near-infrared shielding material fine particle dispersion body, a near-infrared shielding body, and near-infrared shielding material fine particles that sufficiently transmit a visible light, does not have a half mirror-like appearance, not requiring a large-scale production device for film formation on a substrate, not requiring high temperature heat treatment at the time of film formation, and meanwhile, efficiently shielding invisible near-infrared rays having a wavelength of 780 nm or more, and transparent with no change of color tone, and provides a method for producing the same. However, a market demand for a near-infrared shielding function of the near-infrared shielding body continues to increase, and it is considered difficult to continue to satisfy the requirements of the market even with the tungsten oxide fine particles or/and the composite tungsten oxide fine particles described in patent document 10.

Under the above-described circumstance, and in order to solve the problem, the present invention is provided, and an object of the present invention is to provide near-infrared shielding material fine particles that exhibit an effect of maintaining a high transmittance in a visible light region while shielding a light in a near-infrared region more efficiently than tungsten oxide and composite tungsten oxide of a conventional technique, and the method for producing the same, and a dispersion liquid containing the near-infrared shielding material fine particles.

Means for Solving the Problem

In order to solve the above-describe problem, the present inventors conducted research.

Generally, it is known that a material containing free electrons exhibits a reflection absorption response to an electromagnetic wave due to plasma vibration, the electromagnetic wave having a wavelength of 200 nm to 2600 nm which is around a region of sunlight. Then, when the powder of the material is fine particles smaller than a wavelength of light, it is known that geometric scattering in the visible light region (wavelength 380 nm to 780 nm) is reduced, and transparency in the visible light region is obtained. In the present invention, the term "transparency" is used in the meaning that scattering is small and transparency is high to the light in the visible light region.

On the other hand, it is known that the tungsten oxide expressed by a general formula $WO_{3-x}$ or a so-called tungsten bronze obtained by adding a positive element such as Na to tungsten trioxide is a conductive material and is a material having free electrons. Then, in these materials, a response of free electrons to light in the infrared region is suggested by analysis of single crystal, etc.

The present inventors found the following configuration of the composite tungsten oxide fine particles which are near-infrared shielding material fine particles: the crystals contained therein are hexagonal and a lattice constant of the composite tungsten oxide fine particles is 7.3850 Å or more and 7.4186 Å or less on the a-axis, and 7.5600 Å or more and 7.6240 Å or less on the c-axis, and a particle size of the near-infrared shielding material fine particles is 100 nm or less.

Namely, in order to solve the above-described problem, a first invention is near-infrared shielding material fine particles, wherein the near-infrared shielding material fine particles are composite tungsten oxide fine particles containing a hexagonal crystal structure, a lattice constant of the composite tungsten oxide fine particles is 7.3850 Å or more and 7.4186 Å or less on the a-axis, and 7.5600 Å or more and 7.6240 Å or less on the c-axis, and a particle size of the near-infrared shielding material fine particles is 100 nm or less.

A second invention is the near-infrared shielding material fine particles according to the first invention, wherein the lattice constant of the composite tungsten oxide fine particles is 7.4031 Å or more and 7.4111 Å or less on the a-axis, and 7.5891 Å or more and 7.6240 Å or less on the c-axis.

A third invention is the near-infrared shielding material fine particles according to the first invention, wherein the lattice constant of the composite tungsten oxide fine particles is 7.4031 Å or more and 7.4186 Å or less on the a-axis, and 7.5830 Å or more and 7.5950 Å or less on the c-axis.

A fourth invention is the near-infrared shielding material fine particles, wherein the particle size of the near-infrared shielding material fine particles is 10 nm or more and 100 nm or less.

A fifth invention is the near-infrared shielding material fine particles, wherein the composite tungsten oxide fine particles are expressed by a general formula $M_xW_yO_z$ (wherein M element is one or more elements selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, and satisfying $0.20 \leq x/y \leq 0.37$, and $2.2 \leq z/y \leq 3.0$.).

A sixth invention is the near-infrared shielding material fine particles, wherein the M element is one or more elements selected from Cs and Rb.

A seventh invention is the near-infrared shielding material fine particles, wherein a surface of each near-infrared shielding material fine particle is coated with an oxide containing one or more elements selected from Si, Ti, Zr and Al.

An eighth invention is a near-infrared shielding material fine particle dispersion liquid, wherein the near-infrared shielding material fine particles are dispersed in a solvent.

A ninth invention is a method for producing near-infrared shielding material fine particles, including:

a first step of producing composite tungsten oxide containing a hexagonal crystal structure expressed by a general formula $M_xW_yO_z$ (wherein M element is one or more elements selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, and satisfying $0.20 \leq x/y \leq 0.37$, and $2.2 \leq z/y \leq 3.0$); and a second step of producing composite tungsten oxide fine particles by mechanically pulverizing the composite tungsten oxide obtained in the first step, in which a lattice constant in the hexagonal crystal structure is 7.3850 Å or more and 7.4186 Å or less on the a-axis, and 7.5600 Å or more and 7.6240 Å or less on the c-axis, and a particle size is 100 nm or less.

A tenth invention is the method for producing near-infrared shielding material fine particles according to the ninth invention, wherein in the second step, composite tungsten oxide fine particles are produced, whose lattice constant is 7.4031 Å or more and 7.4111 Å or less on the a-axis and 7.5891 Å or more and 7.6240 Å or less on the c-axis in a hexagonal crystal structure, and whose particle size is 100 nm or less.

An eleventh invention is the method for producing near-infrared shielding material fine particles according to the ninth invention, wherein in the second step, composite tungsten oxide fine particles are produced, whose lattice constant is 7.4031 Å or more and 7.4186 Å or less on the a-axis and 7.5830 Å or more and 7.5950 Å or less on the c-axis in a hexagonal crystal structure, and whose particle size is 100 nm or less.

A twelfth invention is the method for producing near-infrared shielding material fine particle dispersion liquid, wherein the second step of any one of claims 9 to 11 is performed in an appropriate solvent, to obtain a near-infrared shielding material fine particle dispersion liquid in which the near-infrared shielding material fine particles described in claim 1 are dispersed in an appropriate solvent.

Advantage of the Invention

The near-infrared shielding material fine particles and the near-infrared shielding material fine particle dispersion liquid of the present invention, exhibit excellent optical properties such as more efficiently shielding sunlight, particularly light in the near-infrared region, and at the same time maintaining high transmittance in the visible light region, compared with the near-infrared shielding material fine particles and the near-infrared shielding material fine particle dispersion liquid of a conventional technique.

DETAILED DESCRIPTION OF THE INVENTION

The near-infrared shielding material fine particles of the present invention are composite tungsten oxide fine particles containing a hexagonal crystal structure, and a lattice constant of the hexagonal composite tungsten oxide fine particles is 7.3850 Å or more and 7.4186 Å or less on the a-axis, and 7.5600 Å or more and 7.6240 Å or less on the c-axis, and a particle size of the near-infrared shielding material fine particles is 100 nm or less.

The near-infrared shielding material fine particles and the near-infrared shielding material fine particle dispersion body of the present invention will be described hereafter in an order of 1. Near-infrared shielding material, 2. Method for producing near-infrared shielding material fine particles, 3. Near-infrared shielding material fine particle dispersion liquid, 4. Near-infrared shielding material fine particle dispersion body, 5; Near-infrared shielding effect of the near-infrared shielding material fine particle dispersion body.

1. Near-Infrared Shielding Material

The near-infrared shielding material fine particles of the present invention are composite tungsten oxide fine particles having a hexagonal crystal structure, and a lattice constant of the hexagonal composite tungsten oxide fine particles is 7.3850 Å or more and 7.4186 Å or less on the a-axis, and 7.5600 Å or more and 7.6240 Å or less on the c-axis. Further, a value of the ratio (Lattice constant of c-axis/lattice constant of a-axis) is preferably 1.0221 or more and 1.0289 or less.

Then, when the hexagonal composite tungsten oxide has the above-described predetermined lattice constant, the near-infrared shielding material fine particle dispersion body in which the fine particles are dispersed in the medium, exhibits a light transmittance having a maximum value in a wavelength range of 350 nm to 600 nm and a minimum value in a wavelength range of 800 to 2100 nm. More specifically, regarding the wavelength region where the maximum value of the transmittance occurs and the wavelength region where the minimum value occurs, the maximum value occurs in the wavelength range of 440 to 600 nm, and the minimum value occurs in the wavelength range of 1150 to 2100 nm. Namely, the maximum value of the transmittance occurs in the visible light region, and the minimum value of the transmittance occurs in the near-infrared region.

Detailed reasons why the near-infrared shielding material fine particles of the present invention, in which the hexagonal composite tungsten oxide has the above-described predetermined lattice constant, exhibit excellent optical properties are still under investigation. Here, the present inventors proceeded with research as follows and examined as follows.

Generally, effective free electrons are not present in tungsten trioxide ($WO_3$), and therefore absorption and reflection properties in the near-infrared region are small, and it is not effective as an infrared shielding material. Here, although it is known that free electrons are generated in the tungsten oxide by reducing the ratio of tungsten trioxide to tungsten to less than 3, it is found by the present inventors that there is a particularly effective range as a range of a near-infrared shielding material in a specific portion of a composition range of tungsten and oxygen in the tungsten oxide.

Preferably, the composition range of tungsten and oxygen is such that the composition ratio of oxygen to tungsten is 3 or less, and further satisfies $2.2 \leq z/y \leq 2.999$ when the tungsten oxide is expressed as $W_yO_z$. This is because when the value of $z/y$ is 2.2 or more, it is possible to avoid the appearance of a crystal phase of $WO_2$ other than a target in the tungsten oxide, and chemical stability as a material can be obtained, and therefore the tungsten oxide can be used as an effective near-infrared shielding material. Meanwhile, when the value of $z/y$ is 2.999 or less, a required amount of free electrons is generated in the tungsten oxide, and it becomes an efficient near-infrared shielding material.

Further, the tungsten oxide fine particles in a state of finely granulated tungsten oxide is expressed as a general formula $W_yO_z$, a so-called "Magneli phase" having a composition ratio expressed by $2.45 \leq z/y \leq 2.999$ is chemically stable and has a good absorption property in the near-infrared region. Therefore, the tungsten oxide fine particles are preferable as a near-infrared shielding material.

Further, it is also preferable to add M element to the tungsten oxide to form a composite tungsten oxide. This is because by adopting this structure, free electrons are generated in the composite tungsten oxide, and the absorption property derived from the free electrons appears in the near-infrared region and therefore the composite tungsten oxide is also effective as a near-infrared absorbing material in the vicinity of 1000 nm in wavelength.

Here, from a viewpoint of stability in the composite tungsten oxide to which the M element is added, M element is preferably one or more elements selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I.

By using both the control of the above-described oxygen amount and addition of the element that generates free electrons for the composite tungsten oxide, a more efficient near-infrared shielding material can be obtained. When a general formula of the near-infrared shielding material obtained by using both the control of the oxygen amount and the addition of the element that generates free electrons, is expressed as $M_xW_yO_z$ (wherein M element is the above-described M element, W is tungsten, and O is oxygen), the relation of $0.001 \leq x/y \leq 1$, preferably $0.20 \leq x/y \leq 0.37$ is satisfied.

Here, from a viewpoint of stability in the $M_xW_yO_z$ to which the M element is added, M element is preferably one or more elements selected from the group consisting of alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Ti, Si, Ge, Sn, Pb, Sb, B, F, P, S, Se, Br, Te, Ti, Nb, V, Mo, Ta, and Re. From a viewpoint of improving optical properties and weather resistance as the near-infrared shielding material, M element belonging to alkali metal, alkaline earth metal element, transition metal element, 4B group element, and 5B group element is more preferable.

Next, the value of $z/y$ showing the control of the oxygen amount will be described. Regarding the value of $z/y$, a similar mechanism as the near-infrared shielding material expressed by the above-described $W_yO_z$ also works on the near-infrared shielding material expressed by $M_xW_yO_z$, and in addition, in a case of $z/y=3.0$, it is preferable to satisfy $2.2 \leq z/y \leq 3.0$ because there is supply of the free electrons due to the addition amount of the M element.

Further, when the above-described composite tungsten oxide fine particles have a hexagonal crystal structure, transmittance of the fine particles in the visible light region is improved and the absorption of the fine particles in the near-infrared region is improved. In this hexagonal crystal structure, a hexagonal space (tunnel) is formed by assembling six octahedrons formed by units of $WO_6$, and the NM element is arranged in the space to constitute one unit, and a large number of this one unit gather to form a hexagonal crystal structure.

In order to obtain the effect of improving the transmission in the visible light region and improving the absorption in the near-infrared region of the present invention, a unit structure (structure in which six octahedrons formed by units of $WO_6$ gather to form a hexagonal space and the M element is disposed in the space) may be included in the composite tungsten oxide fine particles.

Absorption in the near-infrared region is improved when M element cations are added to the hexagonal spaces and are present. Here, generally when M element having a large ionic radius is added, the hexagonal crystal structure is formed. Specifically, when one or more elements selected from Cs, Rb, K, Tl, In, Ba, Li, Ca, Sr, Fe and Sn are added, the hexagonal crystal structure is likely to be formed, which is preferable.

Further, in the composite tungsten oxide fine particles to which one or more elements selected from Cs and Rb are added among the M elements having a large ionic radius, it is possible to achieve both of the absorption in the near-infrared region and the transmission in the visible light region.

In the case of Cs tungsten oxide fine particles in which Cs is selected as the M element, its lattice constant is preferably 7.4031 Å or more and 7.4186 or less on the a-axis and 7.5750 Å or more and 7.6240 Å or less on the c-axis.

In the case of Rb tungsten oxide fine particles in which Rb is selected as the M element, its lattice constant is preferably 7.3850 Å or more and 7.3950 Å or less on the a-axis and 7.5600 or more and 7.5700 Å or less on the c-axis.

In the case of CsRb tungsten oxide fine particles in which Cs and Rb are selected as M elements, its lattice constant is preferably 7.3850 Å or more and 7.4186 Å or less on the a-axis and 7.5600 Å or more and 7.6240 Å or less on the c-axis.

However, the M element is not limited to the above Cs and Rb. Even if the M element is an element other than Cs or Rb, it may be present as an added M element in the hexagonal spaces formed by units of $WO_6$.

When the composite tungsten oxide fine particles having a hexagonal crystal structure have a uniform crystal structure, the addition amount of the M element to be added is $0.001 \leq x/y \leq 1$, preferably $0.2 \leq x/y \leq 0.5$, more preferably, $0.20 \leq x/y \leq 0.37$, and most preferably $x/y=0.33$. This is because theoretically in a case of $z/y=3$, $x/y=0.33$ is established, and the added M element is considered to be arranged in all the hexagonal spaces.

Here, the inventors of the present invention have made extensive studies in consideration of further improving the near-infrared shielding function of the composite tungsten oxide fine particles, and achieve a structure of increasing the amount of free electrons contained therein.

Namely, as a measure to increase the amount of free electrons, it is found that a mechanical treatment is applied to the composite tungsten oxide fine particles to impart appropriate strain and deformation to the hexagonal crystal structure contained therein. In the hexagonal crystal structure to which the appropriate strain or deformation is imparted, it is considered that an overlapping state of the electron orbitals in the atoms constituting the crystallite structure is changed and the amount of free electrons is increased.

Therefore, the present inventors study as follows: in the dispersing step of producing the near-infrared shielding material fine particle dispersion liquid from particles of the composite tungsten oxide produced by the firing step, the composite tungsten oxide particles are pulverized under predetermined conditions to impart strain and deformation to the crystal structure, thereby increasing the amount of free electrons to further improve the near-infrared shielding function of the composite tungsten oxide fine particles.

From the study, attention was paid to each particle of the composite tungsten oxide particles produced through the firing step. Then, it is found that variation is generated respectively in the lattice constant and the constituent element composition of each particle.

As a result of further study, it is found that desired optical properties are exhibited when the lattice constant of the ultimately obtained composite tungsten oxide fine particles is within a predetermined range, irrespective of the variation of the lattice constant and constituent element composition among the particles.

The inventors who obtained the above knowledge further study on the optical properties of the fine particles while grasping the degree of strain and deformation of the crystal structure of the fine particles, by measuring the lattice constant on the a-axis and on the c-axis in the crystal structure of the composite tungsten oxide fine particles.

Then, as a result of the study, it is found that when the lattice constant is 7.3850 Å or more and 7.4186 Å or less on the a-axis, and 7.5600 Å or more and 7.6240 Å or less on the c-axis in the hexagonal composite tungsten oxide fine particles, the fine particles show a transmittance of a light having a maximum value in a wavelength range of 350 nm to 600 nm, and a minimum value in the wavelength range of 800 nm to 2100 nm, and these fine particles are the near-infrared shielding material fine particles exhibiting an excellent near-infrared shielding effect. Thus, the present invention is completed.

Further, it is also found that in the hexagonal composite tungsten oxide fine particles of the near-infrared shielding material fine particles according to the present invention having lattice constant of 7.3850 Å or more and 7.4186 Å or less on the a-axis, and 7.5600 Å or more and 7.6240 Å or less on the c-axis, especially excellent near-infrared shielding effect is exhibited when the value of x/y showing the addition amount of the M element is within a range of $0.20 \leq x/y \leq 0.37$.

Specifically, the near-infrared shielding material fine particle dispersion body in which the near-infrared shielding material fine particles of the present invention are dispersed in a solid medium and the transmittance at a wavelength of 550 nm is 70% or more, shows a transmittance having a maximum value in the wavelength range of 350 nm to 600 nm and a minimum value in the wavelength range of 800 nm to 2100 nm. Then, it is also found that in the near-infrared shielding material fine particle dispersion body, when the maximum value and the minimum value of the transmittance are expressed as a percentage, and when the difference between the maximum value (%) and the minimum value (%)≥69 (points), namely, the difference between the maximum value and the minimum value is expressed as a percentage, especially an excellent optical property of 69 points or more is exhibited.

Further, the near-infrared shielding material fine particles of the present invention have a particle size of 100 nm or less. Then, from a viewpoint of exhibiting further excellent infrared shielding properties, the particle size is preferably 10 nm or more and 100 nm or less, more preferably 10 nm or more and 80 nm or less, further preferably 10 nm or more and 60 nm or less, and most preferably 10 nm or more and 40 nm or less. When the particle size is in a range of 10 nm or more and 40 nm or less, the most excellent infrared shielding property is exhibited.

Here, the particle size is an average value of the diameters of the individual near-infrared shielding material fine particles that are not aggregated, and an average particle size of the infrared shielding material fine particles contained in the near-infrared shielding material fine particle dispersion body described later.

Meanwhile, the particle size does not include the size of the aggregate of the composite tungsten oxide fine particles, and differs from the dispersed particle size.

The average particle size is calculated from an electron microscope image of the near-infrared shielding material fine particles.

The average particle size of the composite tungsten oxide fine particles contained in the near-infrared shielding material fine particle dispersion body can be obtained by measuring the particle size of 100 composite tungsten oxide fine particles using an image processor and calculating the average value thereof, from a transmission electron microscopic image of a thinned sample of the composite tungsten oxide fine particle dispersion body taken out by cross-sectional machining. For the cross-sectional machining for taking out the thinned sample, a microtome, a cross-section polisher, a focused ion beam (FIB) device, or the like can be used. Note that the average particle size of the composite tungsten oxide fine particles contained in the near-infrared shielding material fine particle dispersion body is the average value of the particle sizes of the composite tungsten oxide fine particles dispersed in the matrix of the solid medium.

Further, from a viewpoint of exhibiting excellent infrared shielding properties, a crystallite size of the composite tungsten oxide fine particles is preferably 10 nm or more and 100 nm or less, more preferably 10 nm or more and 80 nm or less, further preferably 10 nm or more and 60 nm or less, and most preferably 10 nm or more and 40 nm or less. This is because when the crystallite size is in a range of 10 nm or more and 40 nm or less, the most excellent infrared shielding property is exhibited.

Note that the lattice constant and the crystallite size of the composite tungsten oxide fine particles contained in the composite tungsten oxide fine particle dispersion liquid obtained after a crushing treatment, a pulverization treatment or a dispersion treatment, which will be described later, are maintained in the composite tungsten oxide fine particles obtained by removing volatile components from the composite tungsten oxide fine particle dispersion liquid, or in the composite tungsten oxide fine particles contained in the near-infrared shielding material fine particle dispersion body obtained from the composite tungsten oxide fine particle dispersion liquid.

As a result, the effect of the present invention is also exhibited in the composite tungsten oxide fine particle dispersion liquid and the near-infrared shielding material fine particle dispersion body containing composite tungsten oxide fine particles of the present invention.

Further, the composite tungsten oxide fine particles as the near-infrared shielding material fine particles, are preferable single crystals in which a volume ratio of the amorphous phase is 50% or less.

This is because when the composite tungsten oxide fine particles are single crystals in which the volume ratio of an amorphous phase is 50% or less, the crystallite size can be set to 10 nm or more and 100 nm or less, while maintaining the lattice constant within the above-described predetermined range.

In contrast, there is a case that the amorphous phase exists in a volume ratio of more than 50%, although the particle size of the composite tungsten oxide fine particles is 100 nm or less, or a case that the fine particles are polycrystalline, and in such a case, the lattice constant cannot be maintained within the above-described predetermined range. In this case, a transmittance maximum value of the light existing in a wavelength range of 350 nm to 600 nm described above, and a minimum value of the light existing in a wavelength range of 800 nm to 2100 nm are expressed as a percentage, 69 points or more cannot be secured in a difference between the maximum value and the minimum value. As a result, the near-infrared absorption property becomes insufficient and the near-infrared shielding property is insufficiently expressed.

It is confirmed that the composite tungsten oxide fine particle is a single crystal, from the fact that in an electron microscopic image by a transmission electron microscope or the like, grain boundaries are not observed in each fine particle, and only uniform lattice stripes are observed. It is also confirmed that the volume ratio of the amorphous phase is 50% or less in the composite tungsten oxide fine particles, from the fact that uniform lattice stripes are observed throughout the fine particles, and almost no unclear places of the lattice stripes are observed similarly in the transmission electron microscope image.

Further, the amorphous phase is frequently present in an outer peripheral portion of each fine particle, and therefore by paying attention to the outer peripheral portion of each fine particle, the volume ratio of the amorphous phase can be calculated in many cases. For example, in a case of a spherical composite tungsten oxide fine particle, when an amorphous phase whose lattice stripes are unclear is present in a layered manner on the outer peripheral portion of the fine particle, the volume ratio of the amorphous phase in the composite tungsten oxide fine particles is 50% or less, as long as the thickness of the amorphous layer is 10% or less of the particle size.

Meanwhile, when the composite tungsten oxide fine particles are dispersed in a matrix of a solid medium such as a resin constituting the near-infrared shielding material fine particle dispersion body, and when the value obtained by subtracting the crystallite size from the average particle size of the dispersed composite tungsten oxide fine particles is 20% or less of the average particle size, it can be said that the composite tungsten oxide fine particles are single crystals in which the volume ratio of the amorphous phase is 50% or less.

As described above, it is preferable to appropriately adjust a synthesis step, a pulverization step and a dispersion step of the composite tungsten oxide fine particles in accordance with the production equipment, so that the value obtained by subtracting the crystallite size from the average particle size of the composite tungsten oxide fine particles dispersed in the composite tungsten oxide fine particle dispersion body is 20% or less of the value of the average particle size.

Further, the surface of the fine particles constituting the infrared shielding material of the present invention is coated with an oxide containing at least one kind of Si, Ti, Zr and Al. This is preferable from a viewpoint of improving the weather resistance of the infrared shielding material.

Further, the near-infrared shielding material fine particle dispersion body containing the composite tungsten oxide fine particles of the present invention absorbs light in the near-infrared region, particularly around the wavelength of 1000 nm, and therefore a transmission color tone thereof is from blue to green in many cases. The dispersed particle size of the near-infrared shielding material fine particles can be selected depending on the purpose of use thereof. First, when used for applications for maintaining transparency, the near-infrared shielding material fine particles preferably have the dispersed particle size of 800 nm or less. This is because particles with a dispersed particle size of smaller than 800 nm do not completely shield light by scattering, and it is possible to maintain visibility in the visible light region and simultaneously maintain transparency efficiently. Particularly, when emphasis is place on the transparency in the visible light region, it is preferable to further consider scattering by particles.

The dispersed particle size of the above-described near-infrared shielding material fine particles is a concept including the size of the aggregate of the composite tungsten oxide fine particles, and is a concept different from the particle size of the near-infrared shielding material fine particles of the present invention as described above.

When emphasis is placed on reduction of scattering by this particle, the dispersed particle size is preferably 200 nm or less, more preferably 10 nm or more and 200 nm or less, further preferably 10 nm or more and 100 nm or less. The reason is as follows. When the dispersed particle size is small, the scattering of light in the visible light region of a wavelength range of 400 nm to 780 nm due to geometric scattering or Mie scattering is reduced, and as a result, it is possible to avoid a situation in which an infrared shielding film becomes like a frosted glass and clear transparency cannot be obtained. Namely, when the dispersed particle size becomes 200 nm or less, the above geometric scattering or Mie scattering is reduced and a region becomes a Rayleigh scattering region. In the Rayleigh scattering region, the scattered light is proportional to the sixth power of the dispersed particle size, and therefore the scattering is reduced with a decrease of the dispersed particle size and the transparency is improved. Further, when the dispersed particle size becomes 100 nm or less, the scattered light is extremely reduced, which is preferable. From a viewpoint of avoiding scattering of light, it is preferable that the dispersed particle size is small, and when the dispersed particle size is 10 nm or more, industrial production is easy.

By setting the dispersed particle size to 800 nm or less, the haze value of the near-infrared shielding material fine particle dispersion body in which the near-infrared shielding material fine particles are dispersed in a medium, can be set to 10% or less with a visible light transmittance of 85% or less. Particularly, by setting the dispersed particle size to 100 nm or less, the haze can be reduced to 1% or less.

It is necessary to examine the light scattering of the near-infrared shielding material fine particle dispersion body, by the dispersed particle size, in consideration of the aggregate of the near-infrared shielding material fine particles.

It is also found that a near-infrared shielding film produced by dispersing the fine particles in an appropriate medium or on the surface of the medium, absorbs the sunlight, particularly the light in the near-infrared region more efficiently and at the same time transmits the light in the visible light region even without using the interference effect of light, compared to a film produced by a dry method like a vacuum deposition method such as a sputtering method, a vapor deposition method, an ion plating method and a chemical vapor deposition method (CVD method), or a film prepared by CVD method or spray method.

2. Method for Producing the Near-Infrared Shielding Material Fine Particles

The composite tungsten oxide fine particles expressed by the general formula $M_xW_yO_z$ of the present invention, can be produced by a solid phase reaction method of applying heat treatment to a tungsten compound as a starting material for the tungsten oxide fine particles in a reducing gas atmosphere, a mixed gas atmosphere of a reducing gas and an inert gas, or an inert gas atmosphere. After passing through the heat treatment, the composite tungsten oxide fine particles obtained by being made finer by pulverization treatment or the like so as to have a predetermined particle size, have sufficient near-infrared absorbing power and have preferable properties as near-infrared shielding fine particles.

As a starting material for obtaining the composite tungsten oxide fine particles expressed by the above general formula $M_xW_yO_z$ of the present invention, it is possible to use a mixed powder at a ratio of $0.20 \leq x/y \leq 0.37$, the mixed powder being one or more powder selected from tungsten trioxide powder, tungsten dioxide powder, or a hydrate of tungsten oxide, or tungsten hexachloride powder, or ammonium tungstate powder, or a tungsten oxide hydrate powder obtained by dissolving tungsten hexachloride in alcohol and drying the mixture, or a tungsten oxide hydrate powder obtained by dissolving tungsten hexachloride in alcohol, making it precipitated by adding water and drying, or a tungsten compound powder obtained by drying an aqueous ammonium tungstate solution, or a metal tungsten powder, and a powder of a simple substance or a compound containing M element.

Further, when the tungsten compound as the starting material for obtaining the composite tungsten oxide fine particles is a solution or a dispersion liquid, each element can easily be uniformly mixed.

From this viewpoint, it is further preferable that the starting material of the composite tungsten oxide fine particles is a powder obtained by mixing an alcohol solution of tungsten hexachloride, an ammonium tungstate solution, and a solution of a compound containing the M element, and then drying the mixture.

From a similar viewpoint, it is also preferable that the starting material of the composite tungsten oxide fine particles is a powder obtained by mixing a dispersion liquid prepared by dissolving tungsten hexachloride in alcohol and then adding water to form a precipitate, and powder of simple substance or compound containing M element or a solution of the compound containing the M element, and then drying the mixture.

Examples of the compound containing the M element include a tungstate, a chloride salt, a nitrate, a sulfate, an oxalate, an oxide, a carbonate and a hydroxide of the M element. However, the compound is not limited thereto and a compound in a solution state may be acceptable. Further, when the composite tungsten oxide fine particles are produced industrially, hazardous gases and the like are not generated at the stage of the heat treatment or the like, by using tungsten oxide hydrate powder or tungsten trioxide and carbonate or hydroxide of M element, which is a preferable production method.

Here, explanation will be given for heat treatment conditions for the composite tungsten oxide fine particles in the reducing atmosphere or in the mixed gas atmosphere of the reducing gas and the inert gas.

First, the starting material is heat-treated in the reducing gas atmosphere or in the mixed gas atmosphere of the reducing gas and the inert gas. This heat treatment temperature is preferably higher than a temperature at which the composite tungsten oxide fine particles are crystallized. Specifically, 500° C. or more and 1000° C. or less is preferable, and 500° C. or more and 800° C. or less is more preferable. If desired, heat treatment may be performed at 500° C. to 1200° C. in the inert gas atmosphere.

Further, the reducing gas is not particularly limited, but is preferably $H_2$. Further, when $H_2$ is used as the reducing gas, its concentration is not particularly limited as long as it is appropriately selected according to a firing temperature and an amount of the starting material. For example, the concentration is 20 vol % or less, preferably 10 vol % or less, more preferably 7 vol % or less. This is because when the concentration of the reducing gas is 20 vol % or less, it is possible to avoid the generation of $WO_2$ not having a solar radiation shielding function by rapid reduction.

By this heat treatment, $2.2 \leq z/y \leq 3.0$ is satisfied in the composite tungsten oxide.

Meanwhile, the method for producing the composite tungsten oxide is not limited to the solid phase reaction method. By setting an appropriate producing condition, the composite tungsten oxide can also be produced by a thermal plasma method. Examples of the producing conditions to be appropriately set, include: a supply rate at the time of supplying the raw material into thermal plasma; a flow rate of a carrier gas used for supplying the raw material; a flow rate of a plasma gas for holding a plasma region; and a flow rate of a sheath gas flowing just outside the plasma region etc.

It is preferable to coat the surface of the near-infrared shielding material fine particles obtained in the above-described step, with an oxide containing one or more kinds of metals selected from Si, Ti, Zr and Al, from a viewpoint of improving the weather resistance. The coating method is not particularly limited, but it is possible to coat the surface of the near-infrared shielding material fine particles by adding the metal alkoxide into a solution in which the near-infrared shielding material fine particles are dispersed.

A bulk body or the particles of the composite tungsten oxide may be made finer through the near-infrared shielding material fine particle dispersion liquid described later. In order to obtain the composite tungsten oxide fine particles from the near-infrared shielding material fine particle dispersion liquid, a solvent may be removed by a known method.

Further, as for forming the composite tungsten oxide bulk body and particles into finer particles, a dry process using a jet mill or the like is possible for obtaining the finer particles. However, as a matter of course, even in a case of the dry process for obtaining the finer particles, pulverization conditions (conditions for forming particles into finer particles) are set for the particles to have the particle size, the crystallite size, and a-axis length and c-axis length as the lattice constants of the obtained composite tungsten oxide. For example, if the jet mill is used, it is sufficient to select the jet mill which has an air flow rate and a treatment time as appropriate pulverization conditions.

3. Near-Infrared Shielding Material Fine Particle Dispersion Liquid

The above-described composite tungsten oxide fine particles mixed and dispersed in an appropriate solvent is the near-infrared shielding material fine particle dispersion liquid of the present invention. The solvent is not particularly limited, and may be appropriately selected according to coating and kneading conditions, a coating and kneading environment, and further a binder when an inorganic binder or a resin binder is contained. For example, it is possible to use water and various organic solvents like alcohols such as ethanol, propanol, butanol, isopropyl alcohol, isobutyl alcohol and diacetone alcohol, ethers such as methyl ether, ethyl ether, propyl ether, esters, ketones such as acetone, methyl ethyl ketone, diethyl ketone, cyclohexanone, isobutyl ketone, and aromatic hydrocarbons such as toluene.

Further, if necessary, acid or alkali may be added to adjust pH of the dispersion liquid.

Further, as the solvent, monomers or oligomers of resin may be used.

On the other hand, in order to further improve a dispersion stability of the fine particles in the dispersion liquid, it is of course also possible to add various dispersants, surfactants, coupling agents and the like.

In the infrared shielding material fine particle dispersion liquid, when 80 parts by weight or more of the solvent is contained based on 100 parts by weight of the near-infrared shielding material fine particles, it is easy to ensure preservability as a dispersion liquid, and it is possible to secure the workability at the time of preparing the near-infrared shielding material fine particle dispersion body thereafter.

The method for dispersing the composite tungsten oxide fine particles in the solvent is a method for uniformly dispersing the fine particles in the dispersion liquid, and the method is not particularly limited, provided that the particle size of the composite tungsten oxide fine particles can be adjusted to 100 nm or less, preferably 10 nm or more and 100 nm or less, more preferably 10 nm or more and 80 nm or less, further preferably 10 nm or more and 60 nm or less, most preferably 10 nm or more and 40 nm or less, while securing the range of 7.3850 Å or more and 7.4186 Å or less on the a-axis and 7.5600 Å or more and 7.6240 Å or less on the c-axis in the crystal structure of the composite tungsten oxide fine particles. For example, a bead mill, a ball mill, a sand mill, a paint shaker, an ultrasonic homogenizer, and the like can be used.

By means of a mechanical dispersion treatment step using these instruments, the process of forming particles into finer particles is progressed due to collision between the composite tungsten oxide particles simultaneously with dispersion of the composite tungsten oxide fine particles in the solvent, strain and deformation are imparted to the hexagonal crystal structure contained in the composite tungsten oxide particles, thereby changing an overlapping state of the electron orbitals in the atoms constituting the crystallite structure, and the increase of a free electron amount is accelerated.

The process of forming the composite tungsten oxide particles into finer particles and fluctuation of a-axis length and c-axis length as the lattice constants in the hexagonal crystal structure, are different depending on device constants of a pulverizer. Accordingly, it is important to perform experimental pulverization beforehand, and determine a pulverizer and pulverizing conditions for the composite tungsten oxide fine particles to have a predetermined particle size, crystallite size, a-axis length and c-axis length as the lattice constants.

Particularly, depending on the conditions at the time of forming the composite tungsten oxide particles into finer particles, the lattice constant of the composite tungsten oxide fine particles does not satisfy 7.3850 Å or more and 7.4186 Å or less on the a-axis, and 7.5600 Å or more and 7.6240 Å or less on the c-axis in some cases. Therefore, as a condition for forming the composite tungsten oxide particles into finer particles, it is important to set the conditions to ensure that the lattice constant of the composite tungsten oxide fine particles obtained by forming the particles into finer particles, is 7.3850 Å or more and 7.4186 Å or less on the a-axis and 7.5600 Å or more and 7.6240 Å or less on the c-axis.

The composite tungsten oxide fine particles of the present invention exhibit a sufficient near-infrared shielding function by satisfying the above-described lattice constant. Therefore it is important to pay attention to setting conditions when forming particles into finer particles.

Even when the infrared shielding material fine particles are formed into finer particles through the near-infrared shielding material fine particle dispersion liquid, and then the solvent is removed to obtain the near-infrared shielding material fine particles, it is a matter of course that the pulverizing conditions (conditions for forming finer particles) are set, for the particles to have a particle size, a crystallite size, and a-axis length and c-axis length as the lattice constants.

A state of the near-infrared shielding material fine particle dispersion liquid of the present invention can be confirmed by measuring a dispersion state of the composite tungsten oxide fine particles when the tungsten oxide fine particles are dispersed in the solvent. For example, the composite tungsten oxide fine particles of the present invention can be confirmed by sampling a sample from a liquid existing as fine particles and an aggregated state of the fine particles in the solvent, and measuring the sample with various commercially available particle size distribution meters. As a particle size distribution meter, for example, a known measuring device such as ELS-8000 manufactured by Otsuka Electronics Co., Ltd. based on the principle of dynamic light scattering method can be used.

Further, the measurement of the crystal structure and the lattice constant of the composite tungsten oxide fine particles is performed as follows. For the composite tungsten oxide fine particles obtained by removing the solvent of the near-infrared shielding dispersion liquid, the crystal structure contained in the fine particles is specified by an X-ray diffraction method, and by using the Rietveld method, a-axis length and c-axis length are calculated as the lattice constants.

From the viewpoint of optical properties, the dispersed particle size of the composite tungsten oxide fine particles is preferably sufficiently fine from 800 nm or less, preferably 200 nm or less, more preferably 100 nm or less. Further, it is preferable that the composite tungsten oxide fine particles are uniformly dispersed.

This is because when the dispersed particle size of the composite tungsten oxide fine particles is 800 nm or less, preferably 200 nm or less, more preferably 10 nm or more and 200 nm or less, further preferably 10 nm or more and 100 nm or less, it is possible to avoid a situation in which the produced near-infrared shielding film or molded body (plate, sheet, etc.) becomes monotonously gray-colored one with reduced transmittance.

The term "dispersed particle size" of the present invention is a concept meaning the particle size of the single particles of the composite tungsten oxide fine particles or the aggregated particles in which the composite tungsten oxide fine particles are aggregated which are dispersed in the near-infrared shielding material fine particle dispersion liquid. The dispersed particle size can be measured with various commercially available particle size distribution meters, and can be measured, for example by sampling the sample of the composite tungsten oxide fine particle dispersion liquid, and measuring the sample using a particle size measuring device based on the dynamic light scattering method (ELS-8000 manufactured by Otsuka Electronics Co., Ltd.).

On the other hand, in the near-infrared shielding material fine particle dispersion liquid, the composite tungsten oxide fine particles are aggregated to form coarse aggregates, and when there are many coarse particles, the coarse particles become light scattering sources. As a result, when the near-infrared shielding material fine particle dispersion liquid becomes a near-infrared shielding film or a molded body, the cloudiness (haze) is increased, which may cause reduction of the visible light transmittance. Accordingly, it is preferable to avoid formation of coarse particles of the composite tungsten oxide fine particles.

4. Near-Infrared Shielding Material Fine Particle Dispersion Body

The near-infrared shielding material fine particle dispersion body of the present invention is obtained by dispersing the above-described composite tungsten oxide fine particles in an appropriate solid medium.

The near-infrared shielding material fine particle dispersion body of the present invention has an advantage that it can be applied to a substrate material having a low heat resistance temperature such as a resin material, and it is inexpensive without requiring a large-sized apparatus at the time of forming, because a dispersed state is maintained in a solid medium such as a resin after the composite tungsten oxide fine particles are mechanically pulverized under predetermined conditions.

Further, the near-infrared shielding material of the present invention is a conductive material, and therefore when used as a continuous film, there is a danger that it will interfere with radio waves of mobile phones, etc., by absorbing or reflecting the waves. However, when the near-infrared shielding material is dispersed in the matrix of the solid medium as fine particles, each particle is dispersed in an isolated state, and therefore the near-infrared shielding material has versatility because it exhibits radio wave transparency.

There is sometimes a difference between the average particle size of the composite tungsten oxide fine particles dispersed in the matrix of the solid medium of the near-infrared shielding material fine particle dispersion body, and the dispersed particle size of the composite tungsten oxide fine particles dispersed in the near-infrared shielding material fine particle dispersion liquid used for forming the near-infrared shielding material fine particle dispersion body and the dispersion liquid for forming a near-infrared shielding body. This is because the aggregation of the composite tungsten oxide fine particles aggregated in the dispersion liquid is dissolved when the near-infrared shielding material fine particle dispersion body is obtained from the near-infrared shielding material fine particle dispersion liquid and the dispersion liquid for forming the near-infrared shielding body.

Further, as the solid medium of the near-infrared shielding material fine particle dispersion body, various resins and glasses can be used. When the solid medium is contained in an amount of 80 parts by weight or more based on 100 parts by weight of the near-infrared shielding material fine particles, the near-infrared shielding material fine particle dispersion body can be preferably formed.

5. Near-infrared shielding effect of the near-infrared shielding material fine Particle Dispersion Body The near-infrared shielding material fine particle dispersion body in which the near-infrared shielding material fine particles of the present invention are used, has a light transmittance with a maximum value in a wavelength range of 350 nm to 600 nm, and a minimum value in a wavelength range of 800 nm to 2100 nm, and when the difference between the maximum value (%) and the minimum value (%) is expressed as a percentage, it is possible to obtain the near-infrared shielding material fine particle dispersion body having especially an excellent optical property that the maximum value (%)–the minimum value (%)≤69 (points), namely, the difference between the maximum value and the minimum value is 69 points or more in percentage. When the difference between the maximum value and the minimum value of the transmittance in the near-infrared shielding material fine particle dispersion body is as large as 69 points or more, this means that the near-infrared shielding property of the dispersion body is excellent.

EXAMPLES

Hereinafter, the present invention will be described in more detail by way of examples, but the present invention is not limited thereto.

Further, for the measurement of the crystal structure, the lattice constant and the crystallite size of the composite tungsten oxide fine particles of the present invention, the composite tungsten oxide fine particles obtained by removing the solvent from the dispersion liquid for forming the near-infrared shielding body was used. Then, an X-ray diffraction pattern of the composite tungsten oxide fine particles was measured by a powder X-ray diffraction method (θ-2θ method) using a powder X-ray diffractometer (X'Pert-PRO/MPD manufactured by Spectris Corporation PANalytical). From the obtained X-ray diffraction pattern, the crystal structure contained in the fine particle was specified, and further, the lattice constant and the crystallite size were calculated using the Rietveld method.

Example 1

7.43 kg of cesium carbonate ($Cs_2CO_3$) was dissolved in 6.70 kg of water to obtain a solution. The solution was added to 34.57 kg of tungstic acid ($H_2WO_4$) and sufficiently stirred and mixed, and thereafter dried while stirring (the molar ratio between W and Cs is equivalent to 1:0.33). The dried product was heated while supplying 5 vol % of Hz gas using $N_2$ gas as a carrier, and fired at a temperature of 800° C. for 5.5 hours, and thereafter, the supply gas was switched to $N_2$ gas only, and the temperature was lowered to room temperature to obtain Cs tungsten oxide particles a.

20 mass % of the Cs tungsten oxide particle a, 8 mass % of an acrylic polymer dispersant (amine value: 48 mg KOH/g, acrylic dispersant having a decomposition temperature of 250° C.) having a group containing an amine as a functional group (referred to as "dispersant a" hereafter), and 72 mass % of butyl acetate were weighed, and a mixture was charged in a paint shaker (manufactured by Asada Iron Works Co., Ltd.) containing 0.3 mmφ $ZrO_2$ beads, followed by pulverization/dispersion treatment for 20 hours to prepare a near-infrared shielding material fine particle dispersion liquid (A-1 solution).

Here, when the dispersed particle size of the Cs tungsten oxide fine particles a in the near-infrared shielding material fine particle dispersion liquid (A-1 solution) was measured with a particle size measuring device (ELS-8000 manufactured by Otsuka Electronics Co., Ltd.) based on a dynamic light scattering method, it was 70 nm. Further, when the lattice constant of the Cs tungsten oxide fine particles a after removing the solvent from the (A-1 solution) was measured, it was 7.4071 Å on the a-axis, and 7.6188 Å on the c-axis. The crystallite size was 24 nm.

Further, the visible light transmittance and the near-infrared shielding property were measured as optical properties of the (A-1 solution) using a spectrophotometer U-4000 manufactured by Hitachi, Ltd. For the measurement, a dispersion liquid in which the (A-1 solution) was diluted with butyl acetate so as to have a visible light transmittance of around 70% in a measuring glass cell of a spectrophotometer was used. Further, in this measurement, an incident direction of light of the spectrophotometer was set to be perpendicular to the measurement glass cell. Further, the transmittance of the light was also measured for a blank solution containing only butyl acetate as a solvent in the measurement glass cell, and this transmittance was used as a baseline of the light transmittance.

Here, the visible light transmittance was obtained according to JIS R 3106, and the near-infrared shielding property was obtained, with a value of the difference between the maximum value of the percentage of the transmittance in the visible light region and the minimum value of the percentage of the transmittance in the near-infrared light region as a point. As a result, the visible light transmittance was 70.0%, and the difference between the maximum value and the minimum value of the transmittance was 76.8 points.

Next, the obtained dispersion liquid (A-1 solution) and the UV curable resin were weighed so that the weight ratio was 1:9, and mixed and stirred to prepare a dispersion liquid for forming a near-infrared shielding body (AA-1 solution).

Then, the dispersion liquid (AA-1 solution) for forming the near-infrared shielding body was applied onto a soda-lime glass substrate having a thickness of 3 mm by using a bar coater of Bar-No 16 and dried at 70° C. for 1 minute, and irradiated with a high pressure mercury lamp to obtain a near-infrared shielding body A as a near-infrared shielding material fine particle dispersion body of example 1.

Here, for the near-infrared shielding body A, the optical properties were measured in the same manner as in the above-described near-infrared shielding material fine particle dispersion liquid (A-1 solution). As a result, the visible light transmittance was 69.7%, and the difference between the maximum value and the minimum value of the transmittance was 74.1 points. Further, the transmittance for light having wavelengths of 550 nm, 1000 nm, and 1500 nm was measured. In addition, a flaked sample of the near-infrared shielding body A was prepared by cross-sectional processing using FIB processor FB2200 manufactured by Hitachi High-Technologies Corporation, and when the average particle size of 100 Cs tungsten oxide fine particles dispersed in the near-infrared shielding body A was calculated by TEAM observation using a transmission electron microscope HF-2200 manufactured by Hitachi High-Technologies Corporation, it was found to be 25 nm.

Hereinafter, the same measurement was performed also in example 2 to 17 and comparative example 1 to 9. Then, the results of example 1 to 17 are shown in Table 1, and the results of comparative example 1 to 9 are shown in Table 2.

Example 2

In the same manner as in example 1 except that predetermined amounts of tungstic acid and cesium carbonate were weighed so that the molar ratio of W and Cs was 1:0.31 in example 1, infrared shielding material fine particle dispersion liquid (A-2 solution), Cs tungsten oxide fine particles b, and near-infrared shielding body B of example 2 were obtained.

The dispersed particle size of the Cs tungsten oxide fine particles b in the near-infrared shielding material fine particle dispersion liquid (A-2 solution) was 70 nm. Then, the lattice constant of the Cs tungsten oxide fine particles b was 7.4100 Å on the a-axis and 7.6138 Å on the c-axis. The crystallite size was 24 nm.

Then, as a result of measuring the visible light transmittance and the near-infrared shielding property of the near-infrared shielding body B, the visible light transmittance was 69.8%, and the difference between the maximum value and the minimum value of the transmittance was 73.0 points. By TEM observation, the average particle size of the Cs tungsten oxide fine particles dispersed in the near-infrared shielding body B was found to be 25 nm. The results are shown in Table 1.

Example 3

In the same manner as in example 1 except that predetermined amounts of tungstic acid and cesium carbonate were weighed so that the molar ratio of W and Cs was 1:0.35 in example 1, infrared shielding material fine particle dispersion liquid (A-3 solution), Cs tungsten oxide fine particles c and near-infrared shielding body C of example 3 were obtained.

The dispersed particle size of the Cs tungsten oxide fine particles c in the near-infrared shielding material fine particle dispersion liquid (A-3 solution) was 70 nm. The lattice constant of the Cs tungsten oxide fine particles c was 7.4065 Å on the a-axis and 7.6203 Å on the c-axis. The crystallite size was 24 nm.

Then, as a result of measuring the visible light transmittance and the near-infrared shielding property of the near-infrared shielding body C, the visible light transmittance was 69.8%, and the difference between the maximum value and the minimum value of the transmittance was 73.6 points. By TEM observation, the average particle size of the Cs tungsten oxide fine particles dispersed in the near-infrared shield C was found to be 24 nm. The results are shown in Table 1.

Example 4

In the same manner as in example 1 except that predetermined amounts of tungstic acid and cesium carbonate were weighed so that the molar ratio of W and Cs was 1:0.37 in example 1, dispersion liquid (A-4 solution) for forming the infrared shielding body, Cs tungsten oxide fine particles d and near-infrared shielding body D of example 4 were obtained.

The dispersed particle size of the Cs tungsten oxide fine particles d in the infrared shielding material fine particle dispersion liquid (A-4 solution) was 70 nm. The lattice constant of the Cs tungsten oxide fine particles d was 7.4066 Å on the a-axis and 7.6204 Å on the c-axis. The crystallite size was 24 nm. Then, as a result of measuring the visible light transmittance and the near-infrared shielding property of the near-infrared shielding body D), the visible light transmittance was 69.8%, and the difference between the maximum value and the minimum value of the transmittance was 73.6 points. By TEM observation, the average particle size of the Cs tungsten oxide fine particles dispersed in the near-infrared shielding body D was found to be 25 nm. The results are shown in Table 1.

Example 5

In the same manner as in example 1 except that predetermined amounts of an aqueous ammonium metatungstate solution (50 wt % in terms of $WO_3$) and cesium carbonate were weighed so that the molar ratio of W and Cs was 1:0.33, the infrared shielding material fine particle dispersion liquid (A-5 solution), Cs tungsten oxide fine particles e, and near-infrared shielding body E of example 5 were obtained.

The dispersed particle size of the Cs tungsten oxide fine particles e in the near-infrared shielding material fine particle dispersion liquid (A-5 solution) was 70 nm. The lattice constant of the Cs tungsten oxide fine particles e was 7.4065 Å on the a-axis and 7.6193 Å on the c-axis. The crystallite size was 24 nm.

Then, as a result of measuring the visible light transmittance and the near-infrared shielding property of the near-infrared shielding E, the visible light transmittance was 71.7%, and the difference between the maximum value and the minimum value of the transmittance was 70.0 points. By TEM observation, the average particle size of the Cs tungsten oxide fine particles dispersed in the near-infrared shielding body E was found to be 25 nm. The results are shown in Table 1.

Comparative Example 1

In the same manner as in example 1 except that predetermined amounts of tungstic acid and cesium carbonate were weighed so that the molar ratio of W and Cs was 1:0.11 in example 1, infrared shielding material fine particle dispersion liquid (A-6 solution), Cs tungsten oxide fine particles f and near-infrared shielding body F of comparative example 1 were obtained.

The dispersed particle size of the Cs tungsten oxide fine particles f in the near-infrared shielding material fine particle dispersion liquid (A-6 solution) was 70 nm. The lattice constant of the Cs tungsten oxide fine particles f was 7.4189 Å on the a-axis and 7.5825 Å on the c-axis. The crystallite size was 24 nm.

Then, as a result of measuring the visible light transmittance and the near-infrared shielding property of the near-infrared shielding body F, the visible light transmittance was 69.3%, and the difference between the maximum value and the minimum value of the transmittance was 63.4 points, which was less than 69 points. By TEM observation, the average particle size of the Cs tungsten oxide fine particles dispersed in the near-infrared shield F was found to be 24 nm. The results are shown in Table 2.

Comparative Example 2

In the same manner as in example 1 except that predetermined amounts of tungstic acid and cesium carbonate were weighed so that the molar ratio of W and Cs was 1:0.15 in example 1, infrared shielding material fine particle dispersion liquid (A-7 solution), Cs tungsten oxide fine particles g, and near-infrared shielding body G of comparative example 2 were obtained.

The dispersed particle size of the Cs tungsten oxide fine particles g in the near-infrared shielding material fine particle dispersion liquid (A-7 liquid) was 70 nm. The lattice constant of the Cs tungsten oxide fine particles g was 7.4188 Å on the a-axis and 7.5826 Å on the c-axis. The crystallite size was 24 nm.

Then, as a result of measuring the visible light transmittance and the near-infrared shielding property of the near-infrared shielding body G, the visible light transmittance was 69.4%, and the difference between the maximum value and the minimum value of the transmittance was 66.1 points, which was less than 69 points. By TEM observation, the average particle size of the Cs tungsten oxide fine particles dispersed in the near-infrared shielding body G was found to be 25 nm. The results are shown in Table 2.

Comparative Example 3

In the same manner as in example 1 except that predetermined amounts of tungstic acid and cesium carbonate were weighed so that the molar ratio of W and Cs was 1:0.39 in example 1, infrared shielding material fine particle dispersion liquid (A-8 solution), Cs tungsten oxide fine particles h and near-infrared shielding body H of comparative example 2 were obtained.

The dispersed particle size of Cs tungsten oxide fine particles g in the near-infrared shielding material fine particle dispersion liquid (A-8 solution) was 70 nm. The lattice constant of the Cs tungsten oxide fine particles g was 7.4025 Å on the a-axis and 7.6250 Å on the c-axis. The crystallite size was 24 nm.

Then, as a result of measuring the visible light transmittance and the near-infrared shielding property of the near-infrared shielding body G, the visible light transmittance was 69.6%, and the difference between the maximum value and the minimum value of the transmittance was 67.2 points, which was less than 69 points. By TEM observation, the average particle size of the Cs tungsten oxide fine particles dispersed in the near-infrared shielding body H was found to be 25 nm. The results are shown in Table 2.

Example 6

In the same manner as in example 1 except that predetermined amounts of an aqueous ammonium metatungstate solution (50 wt % in terms of $WO_3$) and cesium carbonate were weighed so that the molar ratio of W and Cs was 1:0.21 in example 1, infrared shielding material fine particle dispersion liquid (A-9 solution), Cs tungsten oxide fine particles i and near-infrared shielding body I of example 6 were obtained.

The dispersed particle size of the Cs tungsten oxide fine particles i in the near-infrared shielding material fine particle dispersion liquid (A-9 solution) was 70 nm. The lattice constant of the Cs tungsten oxide fine particles i were 7.4186 Å on the a-axis and 7.5825 Å on the c-axis. The crystallite size was 24 nm.

Then, as a result of measuring the visible light transmittance and the near-infrared shielding property of the near-infrared ray shield E, the visible light transmittance was 69.4%, and the difference between the maximum value and the minimum value of the transmittance was 69.3 points. By TEM observation, the average particle size of the Cs tungsten oxide fine particles dispersed in the near-infrared shielding body I was found to be 24 nm. The results are shown in Table 1.

Example 7

In the same manner as in example 1 except that predetermined amounts of an aqueous ammonium metatungstate solution (50 wt % in terms of $WO_3$) and cesium carbonate were weighed so that the molar ratio of W and Cs was 1:0.23 in example 1, infrared shielding material fine particle dispersion liquid (A-10 solution), Cs tungsten oxide fine particles j, and near-infrared shielding body J of example 7 were obtained.

The dispersed particle size of Cs tungsten oxide fine particles j in the near-infrared shielding material fine particle dispersion liquid (A-10 solution) was 70 nm. The lattice constant of the Cs tungsten oxide fine particles j was 7.4184 Å on the a-axis and 7.5823 Å on the c-axis. The crystallite size was 24 nm.

Then, as a result of measuring the visible light transmittance and the near-infrared shielding property of the near-infrared shielding body J, the visible light transmittance was 69.8%, and the difference between the maximum value and the minimum value of the transmittance was 70.5 points. By TEM observation, the average particle size of the Cs tungsten oxide fine particles dispersed in the near-infrared shielding body J was found to be 25 nm. The results are shown in Table 1.

Example 8

In the same manner as in example 1 except that predetermined amounts of an aqueous ammonium metatungstate solution (50 wt % in terms of $WO_3$) and cesium carbonate were weighed so that the molar ratio of W and Cs was 1:0.25 in example 1, infrared shielding material fine particle dispersion liquid (A-11 solution), Cs tungsten oxide fine particles k, and near-infrared shielding body K of example 8 were obtained.

The dispersed particle size of Cs tungsten oxide fine particles k in the near-infrared shielding material fine particle dispersion liquid (A-11 solution) was 70 nm. The lattice constant of the Cs tungsten oxide fine particles k was 7.4165 Å on the a-axis and 7.5897 Å on the c-axis. The crystallite size was 24 nm.

Then, as a result of measuring the visible light transmittance and the near-infrared shielding property of the near-infrared shielding body K, the visible light transmittance was 69.8%, and the difference between the maximum value and the minimum value of the transmittance was 73.2 points. By TEM observation, the average particle size of the Cs tungsten oxide fine particles dispersed in the near-infrared shielding body K was found to be 24 nm. The results are shown in Table 1.

Example 9

In the same manner as in example 1 except that predetermined amounts of an aqueous ammonium metatungstate solution (50 wt % in terms of $WO_3$) and cesium carbonate were weighed so that the molar ratio of W and Cs was 1:0.27 in example 1, infrared shielding material fine particle dispersion liquid (A-12 solution), Cs tungsten oxide fine particles 1 and near-infrared shielding body L of example 9 were obtained.

The dispersed particle size of the Cs tungsten oxide fine particles 1 in the near-infrared shielding material fine particle dispersion liquid (A-12 solution) was 70 nm. The lattice constant of the Cs tungsten oxide particle 1 was 7.4159 Å on the a-axis and 7.5919 Å on the c-axis. The crystallite size was 24 nm.

Then, as a result of measuring the visible light transmittance and the near-infrared shielding property of the near-infrared shielding body L, the visible light transmittance was 69.5%, and the difference between the maximum value and the minimum value of the transmittance was 72.4 points. By TEM observation, the average particle size of the Cs tungsten oxide fine particles dispersed in the near-infrared shielding body L was found to be 25 nm. The results are shown in Table 1.

Example 10

In the same manner as in example 1 except that predetermined amounts of an aqueous ammonium metatungstate solution (50 wt % in terms of $WO_3$) and cesium carbonate were weighed so that the molar ratio of W and Cs was 1:0.29 in example 1, infrared shielding material fine particle dispersion liquid (A-13 liquid), Cs tungsten oxide fine particles m and near-infrared shielding body M of example 10 were obtained.

The dispersed particle size of the Cs tungsten oxide fine particles m in the near-infrared shielding material fine particle dispersion liquid (A-13 solution) was 70 nm. The lattice constant of the Cs tungsten oxide fine particles m was 7.4133 Å on the a-axis and 7.6002 Å on the c-axis. The crystallite size was 24 nm.

Then, as a result of measuring the visible light transmittance and the near-infrared shielding property of the near-infrared shielding body M, the visible light transmittance was 69.9%, and the difference between the maximum value and the minimum value of the transmittance was 72.8 points. By TEM observation, the average particle size of the Cs tungsten oxide fine particles dispersed in the near-infrared shielding M was found to be 25 nm. The results are shown in Table 1.

Example 1

In the same manner as in example 1 except that predetermined amounts of an aqueous ammonium metatungstate solution (50 wt % in terms of $WO_3$) and cesium carbonate were weighed so that the molar ratio of W and Cs was 1:0.30 in example 1, infrared shielding material fine particle dispersion liquid (A-14 solution), Cs tungsten oxide fine particles n, and near-infrared shielding body N of example 11 were obtained.

The dispersed particle size of the Cs tungsten oxide fine particles n in the near-infrared shielding material fine particle dispersion liquid (A-14 solution) was 70 nm. The lattice constant of Cs tungsten oxide fine particles n was 7.4118 Å on the a-axis and 7.6082 Å on the c-axis. The crystallite size was 24 nm.

Then, as a result of measuring the visible light transmittance and the near-infrared shielding property of the near-infrared shielding body N, the visible light transmittance was 69.7%, and the difference between the maximum value and the minimum value of the transmittance was 72.3 points. By TEM observation, the average particle size of the Cs tungsten oxide fine particles dispersed in the near-infrared shield N was found to be 24 nm. The results are shown in Table 1.

Example 12

In the same manner as in example 1 except that firing was performed at 550° C. for 9.0 hours while supplying 5% $H_2$ gas using $N_2$ gas as a carrier in example 1, infrared shielding material fine particle dispersion liquid (A-15 solution), Cs tungsten oxide fine particle o, and near-infrared shielding body O of example 12 were obtained.

The dispersed particle size of Cs tungsten oxide fine particles o in the near-infrared shielding material fine particle dispersion liquid (A-15 solution) was 70 nm. The lattice constant of the Cs tungsten oxide fine particles o was 7.4068 Å on the a-axis and 7.6190 Å on the c-axis. The crystallite size was 24 nm.

Then, as a result of measuring the visible light transmittance and the near-infrared shielding property of the near-infrared shielding body O, the visible light transmittance was 69.9%, and the difference between the maximum value and the minimum value of the transmittance was 74.0 points. By TEM observation, the average particle size of the Cs tungsten oxide fine particles dispersed in the near-infrared shielding body O was found to be 25 nm. The results are shown in Table 1.

Example 13

5.56 kg of rubidium carbonate ($Rb_2CO_3$) was dissolved in 6.70 kg of water to obtain a solution. The solution was added to 36.44 kg of tungstic acid ($H_2WO_4$) and sufficiently stirred and mixed, and thereafter dried while stirring (the molar ratio between W and Rb is equivalent to 1:0.33). The dried product was heated while supplying 5 vol % of $H_2$ gas using $N_2$ gas as a carrier, and fired at a temperature of 800° C. for 5.5 hours, and thereafter, the supply gas was switched to $N_2$ gas only, and the temperature was lowered to room temperature to obtain Rb tungsten oxide particles.

In the same manner as in example 1 except that the obtained Rb tungsten oxide particles were used instead of Cs tungsten oxide particles, infrared shielding material fine particle dispersion liquid (B-1 solution), Rb tungsten oxide fine particles a, and near-infrared shielding body B1 of example 13 were obtained.

The dispersed particle size of the Rb tungsten oxide fine particles a in the near-infrared shielding material fine particle dispersion liquid (B-1 solution) was 70 nm. The lattice constant of the Rb tungsten oxide fine particles a was 7.3898 Å on the a-axis and 7.5633 Å on the c-axis. The crystallite size was 24 nm.

Then, as a result of measuring the visible light transmittance and the near-infrared shielding property of the near-infrared shielding body B1, the visible light transmittance was 69.6%, and the difference between the maximum value and the minimum value of the transmittance was 69.5 points. By TEM observation, the average particle size of the Rb tungsten oxide fine particles dispersed in the near-infrared shielding body B1 was found to be 25 nm. The results are shown in Table 1.

Example 14

0.709 kg of cesium carbonate ($Cs_2CO_3$) and 5.03 kg of rubidium carbonate ($Rb_2CO_3$) were dissolved in 6.70 kg of water to obtain a solution. The solution was added to 36.26 kg of tungstic acid ($H_2WO_4$) and sufficiently stirred and mixed, and thereafter dried while stirring (the molar ratio between W and Cs is equivalent to 1:0.03, and the molar ratio between W and Rb is equivalent to 1:0.30). The dried product was heated while supplying 5% $H_2$ gas using $N_2$ gas as a carrier, and fired at a temperature of 800° C. for 5.5 hours, and thereafter, the supply gas was switched to $N_2$ gas only, and the temperature was lowered to room temperature to obtain CsRb tungsten oxide particles a.

In the same manner as in example 1 except that the obtained CsRb tungsten oxide particles a were used instead of the Cs tungsten oxide particles, infrared shielding material fine particle dispersion liquid (C-1 solution), CsRb tungsten oxide fine particles a and near-infrared shielding body C1 of example 14 were obtained.

The dispersed particle size of the CsRb tungsten oxide fine particles a in the near-infrared shielding material fine particle dispersion liquid (C-1 solution) was 70 nm. The lattice constant of the CsRb tungsten oxide fine particles a was 7.3925 Å on the a-axis and 7.5730 Å on the c-axis. The crystallite size was 24 nm.

Then, as a result of measuring the visible light transmittance and the near-infrared shielding property of the near-infrared shielding body, the visible light transmittance was 69.7%, and the difference between the maximum value and the minimum value of the transmittance was 70.4 points. By TEM observation, the average particle size of the CsRb tungsten oxide fine particles dispersed in the near-infrared shielding body C1 was found to be 24 nm. The results are shown in Table 1.

Example 15

4.60 kg of cesium carbonate ($Cs_2CO_3$) and 2.12 kg of rubidium carbonate ($Rb_2CO_3$) were dissolved in 6.70 kg of water to obtain a solution. The solution was added to 35.28 kg of tungstic acid ($H_2WO_4$) and sufficiently stirred and mixed, and thereafter dried while stirring (the molar ratio between W and Cs is equivalent to 1:0.20, and the molar ratio between W and Rb is equivalent to 1:0.13). The dried product was heated while supplying 5% $H_2$ gas using $N_2$ gas as a carrier, and fired at a temperature of 800° C. for 5.5 hours, and thereafter, the supply gas was switched to $N_2$ gas only, and the temperature was lowered to room temperature to obtain CsRb tungsten oxide particles b.

In the same manner as in example 1 except that the obtained CsRb tungsten oxide particles b were used instead of the Cs tungsten oxide particles, infrared shielding material fine particle dispersion liquid (C-2 solution), CsRb tungsten oxide fine particles b and near-infrared shielding body C2 of example 15 were obtained.

The dispersed particle size of the CsRb tungsten oxide fine particles b in the near-infrared shielding material fine particle dispersion liquid (C-2 solution) was 70 nm. The lattice constant of the CsRb tungsten oxide fine particles b was 7.4026 Å on the a-axis and 7.6035 Å on the c-axis. The crystallite size was 24 nm.

Then, as a result of measuring the visible light transmittance and the near-infrared shielding property of the near-infrared shielding body C2, the visible light transmittance was 69.7%, and the difference between the maximum value and the minimum value of the transmittance was 71.5 points. By TEM observation, the average particle size of the CsRb tungsten oxide fine particles dispersed in the near-infrared shielding body C2 was found to be 24 nm. The results are shown in Table 1.

Example 16

5.71 kg of cesium carbonate ($Cs_2CO_3$) and 1.29 kg of rubidium carbonate ($Rb_2CO_3$) were dissolved in 6.70 kg of water to obtain a solution. The solution was added to 35.00 kg of tungstic acid ($H_2WO_4$) and sufficiently stirred and mixed, and thereafter dried while stirring (the molar ratio between W and Cs is equivalent to 1:0.25, and the molar ratio between W and Rb is equivalent to 1:0.08). The dried product was heated while supplying 5% $H_2$ gas using $N_2$ gas as a carrier, and fired at a temperature of 800° C. for 5.5 hours, and thereafter, the supply gas was switched to $N_2$ gas only, and the temperature was lowered to room temperature to obtain CsRb tungsten oxide particles c.

In the same manner as in example 1 except that the obtained CsRb tungsten oxide particles c were used instead of the Cs tungsten oxide particles, infrared shielding material fine particle dispersion liquid (C-3 solution), CsRb tungsten oxide fine particles c and near-infrared shielding body C3 of example 16 were obtained.

The dispersed particle size of the CsRb tungsten oxide fine particles c in the near-infrared shielding material fine particle dispersion liquid (C-3 solution) was 70 nm. The lattice constant of the CsRb tungsten oxide fine particles c was 7.4049 Å on the a-axis and 7.6083 Å on the c-axis. The crystallite size was 24 nm.

Then, as a result of measuring the visible light transmittance and the near-infrared shielding property of the near-infrared shielding body, the visible light transmittance was 69.7%, and the difference between the maximum value and the minimum value of the transmittance was 71.5 points. By TEM observation, the average particle size of the CsRb tungsten oxide fine particles dispersed in the near-infrared shielding body C3 was found to be 25 nm. The results are shown in Table 1.

Example 17

6.79 kg of cesium carbonate ($Cs_2CO_3$) and 0.481 kg of rubidium carbonate ($Rb_2CO_3$) were dissolved in 6.70 kg of water to obtain a solution. The solution was added to 34.73 kg of tungstic acid ($H_2WO_4$) and sufficiently stirred and mixed, and thereafter dried while stirring (the molar ratio between W and Cs is equivalent to 1:0.30, and the molar ratio between W and Rb is equivalent to 1:0.03). The dried product was heated while supplying 5% $H_2$ gas using $N_2$ gas as a carrier, and fired at a temperature of 800° C. for 5.5 hours, and thereafter, the supply gas was switched to $N_2$ gas only, and the temperature was lowered to room temperature to obtain CsRb tungsten oxide particles d.

In the same manner as in example 1 except that the obtained CsRb tungsten oxide particles d were used instead of the Cs tungsten oxide particles, infrared shielding material fine particle dispersion liquid (C-4 solution), CsRb tungsten oxide fine particles d and near-infrared shielding body C4 of example 17 were obtained.

The dispersed particle size of the CsRb tungsten oxide fine particles d in the near-infrared shielding material fine particle dispersion liquid (C-4 solution) was 70 nm. The lattice constant of the CsRb tungsten oxide fine particles d was 7.4061 Å on the a-axis and 7.6087 Å on the c-axis. The crystallite size was 24 nm.

Then, as a result of measuring the visible light transmittance and the near-infrared shielding property of the near-infrared shielding body C4, the visible light transmittance was 69.5%, and the difference between the maximum value and the minimum value of the transmittance was 72.1 points. By TEM observation, the average particle size of the CsRb tungsten oxide fine particles dispersed in the near-infrared shielding body C4 was found to be 25 nm. The results are shown in Table 1.

Comparative Examples 4 and 5

In the same manner as in example 1 except that predetermined amounts of tungstic acid and cesium carbonate were weighed so that the molar ratio of W and Cs was 1:0.21 (Comparative Example 4), 1:0.23 (Comparative Example 5), and fired at a temperature of 400° C. for 5.5 hours in example 1, dispersion liquid (A-16 solution and A-17 solution) for forming the near-infrared shielding body, Cs tungsten oxide fine particles p and q, and near-infrared shielding bodies P and Q. The dispersed particle size of the Cs tungsten oxide fine particles p in the near-infrared shielding material fine particle dispersion liquid (A-16 solution) was 70 nm, and the dispersed particle size of Cs tungsten oxide fine particles q in (A-17 solution) was 70 nm. Infrared shielding material fine particle dispersion liquids (A-16 solution and A-17 solution), Cs tungsten oxide fine particles p and q, near-infrared shielding bodies P and Q were evaluated in the same manner as in example 1. The results are shown in Table 2.

Comparative Example 6

In the same manner as in example 1 except that a rotational speed of the paint shaker was set to 0.8 times that in example 1 and the pulverization/dispersion treatment was performed for 100 hours for the Cs tungsten oxide particles a of example 1, near-infrared shielding material dispersion liquid (A-18 solution), Cs tungsten oxide fine particles r, and near-infrared shielding body R were obtained. The dispersed particle size of the Cs tungsten oxide fine particles r in the near-infrared shielding material fine particle dispersion liquid (A-18 solution) was 50 nm. The near-infrared shielding material fine particle dispersion liquid (A-18 solution), the Cs tungsten oxide fine particles r, and the near-infrared shielding body R were evaluated in the same manner as in example 1. The results are shown in Table 2.

Comparative Example 7

In the same manner as in example 1 except that the dried product was fired at a temperature of 440° C. for 5.5 hours while supplying 3 vol % $H_2$ gas using $N_2$ gas as a carrier, for the Cs tungsten oxide particles a of example 1, near-infrared shielding material dispersion liquid (A-19 solution), Cs tungsten oxide fine particle s, and near-infrared shielding body S of comparative example 7 were obtained. The dispersed particle size of the Cs tungsten oxide fine particles s in the near-infrared shielding material fine particle dispersion liquid (A-19 solution) was 75 nm. The near-infrared shielding material fine particle dispersion liquid (A-19 solution), the Cs tungsten oxide fine particles s, and the near-infrared shielding body S were evaluated in the same manner as in example 1. The results are shown in Table 2.

Comparative Example 8

20 mass % of the Cs tungsten oxide particles a, 8 mass % of the dispersant a, and 72 mass % of butyl acetate of example 1 were weighed, and mixed by vibration of ultrasonic wave for 10 minutes, to obtain infrared shielding material dispersion liquid (A-20 solution), Cs tungsten oxide particles a, and near-infrared shielding body T. Namely, the Cs tungsten oxide particles a contained in the near-infrared shielding material dispersion liquid (A-20 solution) are not pulverized. The dispersed particle size of the Cs tungsten oxide fine particles a in the near-infrared shielding material dispersion liquid (A-20 solution) was 150 nm. Infrared shielding material fine particle dispersion liquid (A-20 solution), Cs tungsten oxide particles a, and near-infrared shielding body T were evaluated in the same manner as in example 1. The results are shown in Table 2.

Comparative Example 9

In the same manner as in example 1 except that the rotational speed of the paint shaker was set to 1.15 times that in example 1 and the pulverization/dispersion treatment was performed for 50 hours for the Cs tungsten oxide particles a of example 1, near-infrared shielding material dispersion liquid (A-21 solution), Cs tungsten oxide fine particles u, and near-infrared shielding body U were obtained. The dispersed particle size of the Cs tungsten oxide fine particles u in the near-infrared shielding material fine particle dispersion liquid (A-21 solution) was 110 nm. Near-infrared shielding material fine particle dispersion liquid (A-21 solution), Cs tungsten oxide fine particles u, and near-infrared shielding body U were evaluated in the same manner as in example 1. The results are shown in Table 2.

CONCLUSION

As is clear from Tables 1 and 2, it is found that the near-infrared shielding body produced using the near-infrared shielding material fine particle dispersion liquid containing the near-infrared shielding material fine particles of examples 1 to 17, shields the sunlight, particularly the light in the near-infrared region more efficiently and at the same time maintains a high transmittance in the visible light region, compared to the near-infrared shielding body produced using the near-infrared shielding material fine particle dispersion liquid containing the near-infrared shielding material fine particles of comparative examples 1 to 9.

Particularly, in all of the near-infrared shielding bodies of examples 1 to 17, the difference between the maximum value and the minimum value of the light transmittance exceeds 69 points. In contrast, in all of the near-infrared shielding bodies of comparative examples 1 to 9, the difference was less than 69 points.

TABLE 1

| | Raw material | Ratio Cs/W | Ratio Rb/W | $H_2$ concentration [%] | Firing temperature [° C.] | Firing time [h] | Lattice constant a-axis [Å] | Lattice constant c-axis [Å] |
|---|---|---|---|---|---|---|---|---|
| Example 1 | $Cs_2CO_3$ & $H_2WO_4$ | 0.33 | — | 5 | 800 | 5.5 | 7.4071 | 7.6188 |
| Example 2 | $Cs_2CO_3$ & $H_2WO_4$ | 0.31 | — | 5 | 800 | 5.5 | 7.4100 | 7.6138 |
| Example 3 | $Cs_2CO_3$ & $H_2WO_4$ | 0.35 | — | 5 | 800 | 5.5 | 7.4065 | 7.6203 |
| Example 4 | $Cs_2CO_3$ & $H_2WO_4$ | 0.37 | — | 5 | 800 | 5.5 | 7.4066 | 7.6204 |
| Example 5 | $Cs_2CO_3$ & aqueous ammonium metatungstate solution | 0.33 | — | 5 | 800 | 5.5 | 7.4065 | 7.6193 |
| Example 6 | $Cs_2CO_3$ & $H_2WO_4$ | 0.21 | — | 5 | 800 | 5.5 | 7.4186 | 7.5825 |
| Example 7 | $Cs_2CO_3$ & $H_2WO_4$ | 0.23 | — | 5 | 800 | 5.5 | 7.4184 | 7.5823 |
| Example 8 | $Cs_2CO_3$ & $H_2WO_4$ | 0.25 | — | 5 | 800 | 5.5 | 7.4165 | 7.5897 |
| Example 9 | $Cs_2CO_3$ & $H_2WO_4$ | 0.27 | — | 5 | 800 | 5.5 | 7.4159 | 7.5919 |
| Example 10 | $Cs_2CO_3$ & $H_2WO_4$ | 0.29 | — | 5 | 800 | 5.5 | 7.4133 | 7.6002 |
| Example 11 | $Cs_2CO_3$ & $H_2WO_4$ | 0.30 | — | 5 | 800 | 5.5 | 7.4118 | 7.5082 |
| Example 12 | $Cs_2CO_3$ & $H_2WO_4$ | 0.33 | — | 5 | 550 | 9.0 | 7.4068 | 7.6190 |
| Example 13 | $Cs_2CO_3$ & $H_2WO_4$ | — | 0.33 | 5 | 800 | 5.5 | 7.3898 | 7.5633 |
| Example 14 | $Cs_2CO_3$ & $Rb_2CO_3$ & $H_2WO_4$ | 0.03 | 0.3 | 5 | 800 | 5.5 | 7.3925 | 7.5730 |
| Example 15 | $Cs_2CO_3$ & $Rb_2CO_3$ & $H_2WO_4$ | 0.20 | 0.13 | 5 | 800 | 5.5 | 7.4026 | 7.6035 |
| Example 16 | $Cs_2CO_3$ & $Rb_2CO_3$ & $H_2WO_4$ | 0.25 | 0.08 | 5 | 800 | 5.5 | 7.4049 | 7.6083 |
| Example 17 | $Cs_2CO_3$ & $Rb_2CO_3$ & $H_2WO_4$ | 0.30 | 0.03 | 5 | 800 | 5.5 | 7.4061 | 7.6087 |

| | Crystallite size (nm) | *1 (nm) | *2 [%] | *3 Maximum value − minimum value [Point] | *4 550 nm [%] | *4 1000 nm [%] | *4 1500 nm [%] |
|---|---|---|---|---|---|---|---|
| Example 1 | 24 | 25 | 69.7 | 74.1 | 73.0 | 4.8 | 2.2 |
| Example 2 | 24 | 25 | 69.8 | 73.0 | 73.1 | 4.8 | 2.3 |
| Example 3 | 24 | 25 | 69.8 | 73.6 | 73.1 | 5.0 | 2.4 |
| Example 4 | 24 | 25 | 69.8 | 73.6 | 73.1 | 4.8 | 2.3 |
| Example 5 | 24 | 25 | 71.7 | 70.0 | 74.9 | 5.1 | 2.4 |
| Example 6 | 24 | 24 | 69.4 | 69.3 | 72.1 | 7.2 | 5.1 |
| Example 7 | 24 | 25 | 69.8 | 70.5 | 72.5 | 6.5 | 3.5 |
| Example 8 | 24 | 24 | 69.8 | 73.2 | 73.0 | 4.8 | 2.5 |
| Example 9 | 24 | 25 | 69.5 | 72.4 | 73.1 | 4.8 | 2.2 |
| Example 10 | 24 | 25 | 69.9 | 72.8 | 73.3 | 4.8 | 2.3 |

TABLE 1-continued

|  | *1 | *2 | *3 | *4 | | | |
|---|---|---|---|---|---|---|---|
| Example 11 | 24 | 24 | 69.7 | 72.3 | 73.5 | 4.6 | 2.2 |
| Example 12 | 24 | 25 | 69.9 | 74.0 | 72.9 | 4.7 | 2.1 |
| Example 13 | 24 | 25 | 69.6 | 69.5 | 73.2 | 8.0 | 2.4 |
| Example 14 | 24 | 24 | 69.7 | 70.4 | 73.0 | 7.5 | 2.0 |
| Example 15 | 24 | 24 | 69.7 | 71.5 | 72.8 | 5.8 | 2.1 |
| Example 16 | 24 | 25 | 69.7 | 71.5 | 73.1 | 5.3 | 2.3 |
| Example 17 | 24 | 25 | 69.5 | 72.1 | 73.1 | 5.0 | 2.2 |

*1 . . . Average particle size in a shielding body
*2 . . . Visible light transmittance
*3 . . . Difference of transmittance
*4 . . . Transmittance at each wavelength

TABLE 2

| | Raw material | Ratio Cs/W | Ratio Rb/W | $H_2$ concentration [%] | Firing temperature [° C.] | Firing time [h] | Lattice constant a-axis [Å] | Lattice constant c-axis [Å] |
|---|---|---|---|---|---|---|---|---|
| Comparative example 1 | $Cs_2CO_3$ & $H_2WO_4$ | 0.11 | — | 5 | 800 | 5.5 | 7.4189 | 7.5825 |
| Comparative example 2 | $Cs_2CO_3$ & $H_2WO_4$ | 0.15 | — | 5 | 800 | 5.5 | 7.4188 | 7.5826 |
| Comparative example 3 | $Cs_2CO_3$ & $H_2WO_4$ | 0.39 | — | 5 | 800 | 5.5 | 7.4025 | 7.6250 |
| Comparative example 4 | $Cs_2CO_3$ & $H_2WO_4$ | 0.21 | — | 5 | 400 | 5.5 | 7.4198 | 7.5722 |
| Comparative example 5 | $Cs_2CO_3$ & $H_2WO_4$ | 0.23 | — | 5 | 400 | 5.5 | 7.4192 | 7.5729 |
| Comparative example 6 | $Cs_2CO_3$ & $H_2WO_4$ | 0.33 | — | 5 | 800 | 5.5 | 7.4095 | 7.6312 |
| Comparative example 7 | $Cs_2CO_3$ & $H_2WO_4$ | 0.33 | — | 3 | 440 | 5.5 | 7.4072 | 7.6295 |
| Comparative example 8 | $Cs_2CO_3$ & $H_2WO_4$ | 0.33 | — | 5 | 800 | 5.5 | 7.4076 | 7.6130 |
| Comparative example 9 | $Cs_2CO_3$ & $H_2WO_4$ | 0.33 | — | 5 | 800 | 5.5 | 7.4092 | 7.6325 |

| | Crystallite size (nm) | *1 (nm) | *2 [%] | *3 Maximum value − minimum value [Point] | *4 550 nm [%] | *4 1000 nm [%] | *4 1500 nm [%] |
|---|---|---|---|---|---|---|---|
| Comparative example 1 | 24 | 24 | 69.3 | 63.4 | 71.4 | 18.3 | 12.1 |
| Comparative example 2 | 24 | 25 | 69.4 | 66.1 | 72.3 | 17.1 | 10.9 |
| Comparative example 3 | 24 | 25 | 69.6 | 67.2 | 71.5 | 19.2 | 9.5 |
| Comparative example 4 | 24 | 25 | 69.8 | 58.7 | 72.5 | 26.0 | 17.3 |
| Comparative example 5 | 24 | 25 | 69.9 | 59.9 | 72.1 | 25.0 | 15.2 |
| Comparative example 6 | 9 | 9 | 69.9 | 66.4 | 71.5 | 18.5 | 9.0 |
| Comparative example 7 | 24 | 24 | 69.4 | 67.5 | 73.2 | 18.3 | 6.7 |
| Comparative example 8 | 120 | 122 | 69.6 | 31.5 | 72.4 | 53.0 | 45.0 |
| Comparative example 9 | 9 | 42 | 69.7 | 52.2 | 72.3 | 25.9 | 15.0 |

*1 . . . Average particle size in a shielding body
*2 . . . Visible light transmittance
*3 . . . Difference of transmittance
*4 . . . Transmittance at each wavelength

INDUSTRIAL APPLICABILITY

The present invention is suitably applied to construction fields such as buildings, offices, and general houses, transportation fields such as vehicles, agricultural fields such as vinyl sheets, telephone box, car port, show window, lighting lamp, transparent case, fiber etc., when a near-infrared shielding effect is imparted thereto by using the near-infrared shielding material fine particles.

The invention claimed is:
1. Near-infrared shielding material fine particles,
wherein the near-infrared shielding material fine particles are composite tungsten oxide fine particles containing a hexagonal crystal structure, a lattice constant of the composite tungsten oxide fine particles is 7.4031 Å or more and 7.4186 Å or less on the a-axis, and 7.5830 Å or more and 7.5950 Å or less on the c-axis, and a particle size of the near-infrared shielding material fine particles is 100 nm or less.

2. The near-infrared shielding material fine particles according to claim 1, wherein the particle size of the near-infrared shielding material fine particles is 10 nm or more and 100 nm or less.

3. The near-infrared shielding material fine particles according to claim 1, wherein the composite tungsten oxide fine particles are expressed by a general formula $M_xW_yO_z$, wherein M element is one or more elements selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, TI, Si, Ge, Sn, Pb, Sb, B, F, P, S, Se, Br, Te, Ti, Nb, V, Mo, Ta, Re, Be, Hf, Os, Bi, and I, W is tungsten, O is oxygen, and satisfying $0.20 \leq x/y \leq 0.37$, and $2.2 \leq z/y \leq 3.0$.

4. The near-infrared shielding material fine particles according to claim 3, wherein the M element is one or more elements selected from Cs and Rb.

5. The near-infrared shielding material fine particles according to claim wherein a surface of each near-infrared shielding material fine particle is coated with an oxide containing one or more elements selected from Si, Ti, Zr and Al.

6. A near-infrared shielding material fine particle dispersion liquid, wherein the near-infrared shielding material fine particles of claim 1 are dispersed in a solvent.

7. A method for producing near-infrared shielding material fine particles, comprising:

a first step of producing composite tungsten oxide containing a hexagonal crystal structure expressed by a general formula $M_xW_yO_z$, wherein M element is one or more elements selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, TI, Si, Ge, Sn, Pb, Sb, B, F, P, S, Se, Br, Te, Ti, Nb, V, Mo, Ta, Re, Be, Hf, Os, Bi, and I, W is tungsten, O is oxygen, and satisfying $0.20 \leq x/y \leq 0.37$, and $2.2 \leq y \leq 3.0$; and a second step of producing composite tungsten oxide fine particles by mechanically pulverizing the composite tungsten oxide obtained in the first step, in which a lattice constant in the hexagonal crystal structure is 7.4031 Å or more and 7.4186 Å or less on the a-axis, and 7.5830 Å or more and 7.5950 Å or less on the c-axis, and a particle size is 100 nm or less.

8. The method for producing near-infrared shielding material fine particle dispersion liquid, wherein the second step of claim 7 is performed in an appropriate solvent, to obtain a near-infrared shielding material fine particle dispersion liquid in which the near-infrared shielding material fine particles are dispersed in an appropriate solvent.

* * * * *